US012579443B2

(12) United States Patent
Jie

(10) Patent No.: US 12,579,443 B2
(45) Date of Patent: Mar. 17, 2026

(54) TRAINING SEMANTIC IMAGE SEGMENTATION MODEL COMPRISING DEFORMABLE CONVOLUTIONAL NEURAL NETWORK

(71) Applicant: TENCENT TECHNOLOGY (SHENZHEN) COMPANY LIMITED, Shenzhen (CN)

(72) Inventor: Ze Qun Jie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1364 days.

(21) Appl. No.: 17/238,634

(22) Filed: Apr. 23, 2021

(65) Prior Publication Data

US 2021/0241109 A1      Aug. 5, 2021

Related U.S. Application Data

(63) Continuation of application No. PCT/CN2020/079496, filed on Mar. 16, 2020.

(30) Foreign Application Priority Data

Mar. 26, 2019      (CN) .......................... 201910233985.5

(51) Int. Cl.
*G06N 3/088*      (2023.01)
*G06F 18/214*      (2023.01)
(Continued)

(52) U.S. Cl.
CPC ........... *G06N 3/088* (2013.01); *G06F 18/214* (2023.01); *G06F 18/2415* (2023.01);
(Continued)

(58) Field of Classification Search
CPC ..... G06F 18/214; G06F 18/2431; G06N 3/08; G06N 3/0895; G06V 10/26; G06V 10/764; G06V 10/774
See application file for complete search history.

(56) References Cited

U.S. PATENT DOCUMENTS

2019/0015059 A1      1/2019   Itu et al.

FOREIGN PATENT DOCUMENTS

CN          102436583 A      5/2012
CN          107871117 A      4/2018
(Continued)

OTHER PUBLICATIONS

Zhu, Jian, Leyuan Fang, and Pedram Ghamisi. "Deformable convolutional neural networks for hyperspectral image classification." IEEE Geoscience and Remote Sensing Letters 15.8 (2018): 1254-1258. (Year: 2018).*

(Continued)

*Primary Examiner* — Alexey Shmatov
(74) *Attorney, Agent, or Firm* — Sughrue Mion, PLLC

(57) ABSTRACT

A method for training an image classification model includes obtaining first prediction class annotation information of a first image by using an image classification network based on a first model parameter of an offset network being fixed; determining a second model parameter corresponding to the image classification network by using a classification loss function based on the image content class information and the first prediction class annotation information; obtaining second prediction class annotation information of the first image by using the offset network based on the second model parameter of the image classification network being fixed; determining a third model parameter corresponding to the offset network by using the classification loss function based on the image content class information and the second (Continued)

prediction class annotation information; and training a semantic image segmentation network model based on the second model parameter and the third model parameter.

20 Claims, 8 Drawing Sheets

(51) Int. Cl.

| | |
|---|---|
| *G06F 18/2415* | (2023.01) |
| *G06F 18/2431* | (2023.01) |
| *G06N 3/08* | (2023.01) |
| *G06V 10/26* | (2022.01) |
| *G06V 10/764* | (2022.01) |
| *G06V 10/774* | (2022.01) |
| *G06V 10/82* | (2022.01) |

(52) U.S. Cl.
CPC ........... *G06F 18/2431* (2023.01); *G06N 3/08* (2013.01); *G06V 10/26* (2022.01); *G06V 10/764* (2022.01); *G06V 10/774* (2022.01); *G06V 10/82* (2022.01)

(56) References Cited

FOREIGN PATENT DOCUMENTS

| | | |
|---|---|---|
| CN | 109493330 A | 3/2019 |
| CN | 109784424 A | 5/2019 |

OTHER PUBLICATIONS

Deng, Liuyuan, et al. "Restricted Deformable Convolution based Road Scene Semantic Segmentation Using Surround View Cameras." arXiv preprint arXiv:1801.00708v2 (Jan. 3, 2018). (Year: 2018).*

Zhuang, Yueqing, et al. "RelationNet: Learning deep-aligned representation for semantic image segmentation." 2018 24th International Conference on Pattern Recognition (ICPR). IEEE, 2018. (Year: 2018).*

Poudel, Rudra PK, Stephan Liwicki, and Roberto Cipolla. "Fast-scnn: Fast semantic segmentation network." arXiv preprint arXiv:1902. 04502v1 (Feb. 12, 2019). (Year: 2019).*

Pinheiro, Pedro O., and Ronan Collobert. "From Image-level to Pixel-level Labeling with Convolutional Networks." arXiv preprint arXiv:1411.6228v3 (Apr. 24, 2015). (Year: 2015).*

European Communication dated Mar. 15, 2024 in European Application No. 20 777 689.9.

Yuke Zhu et al., "Visual Semantic Planning using Deep Successor Representations", 2017 IEEE International Conference on Computer Vision, IEEE, 2017, XP033282903, pp. 483-492 (10 pages total).

First Office Action of Chinese Application No. 201910233985.5 dated Aug. 12, 2020.

International Search Report of PCT/CN2020/079496 dated May 22, 2020 [PCT/ISA/210].

Written Opinion of PCT/CN2020/079496 dated May 22, 2020 [PCT/ISA/237].

Written Opinion of the International Searching Authority dated May 22, 2020 in Application No. PCT/CN2020/079496.

Communication dated May 23, 2022, issued in Japanese Application No. 2021-522436.

Wei et al., "Object Region Mining with Adversarial Erasing: A Simple Classification to Semantic Segmentation Approach", 2017 IEEE Conference Vision and Pattern Recognition, 2017, pp. 6488-6496 (11 pages).

Dai et al., "Deformable Convolutional Networks", 2017 IEEE International Conference on Computer Vision, 2017, pp. 764-773 (12 pages).

* cited by examiner

Uncrewed vehicle

Notebook computer

Mobile phone

Tablet computer

Server

PC

Palmtop computer

Robot

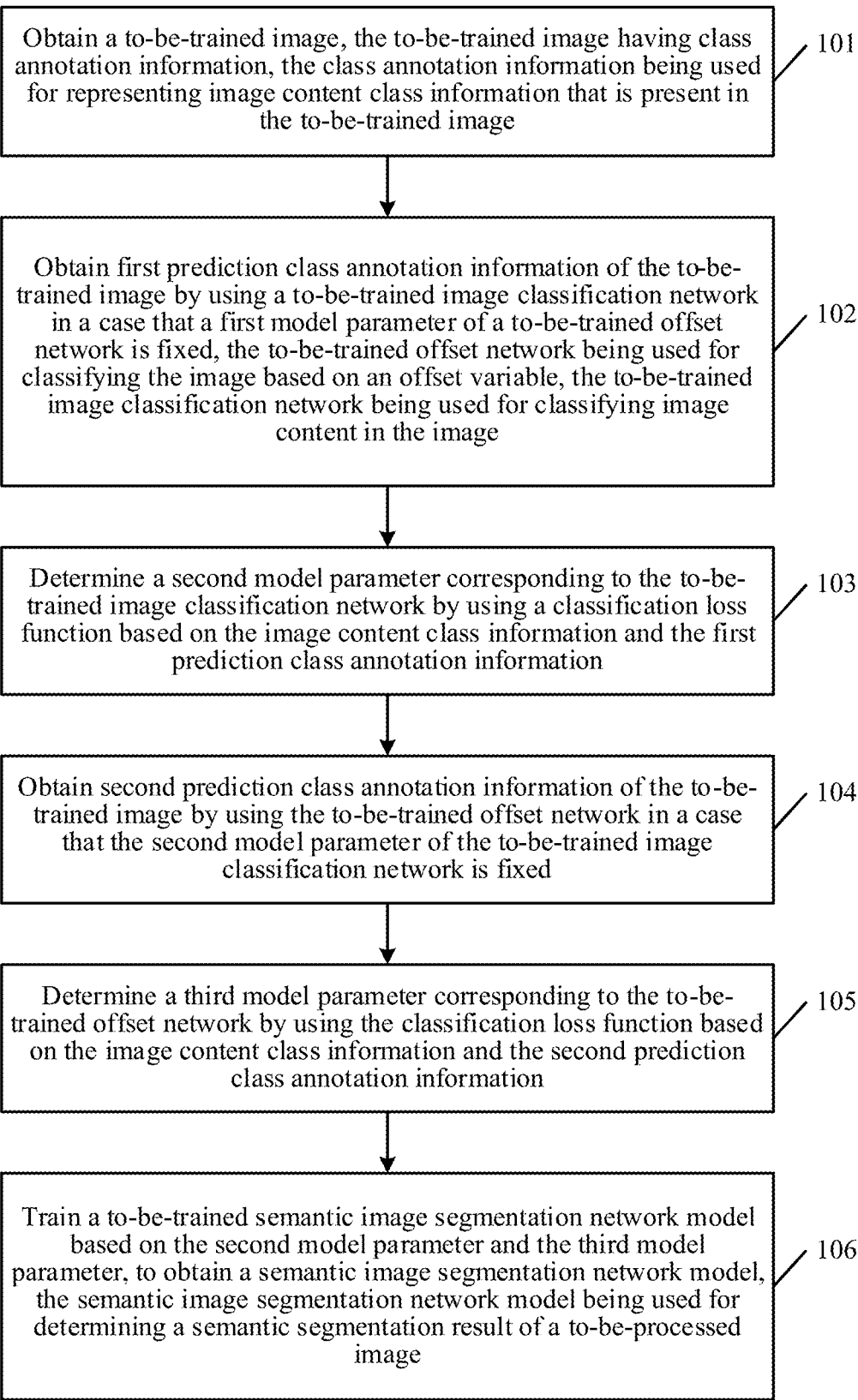

Obtain a to-be-trained image, the to-be-trained image having class annotation information, the class annotation information being used for representing image content class information that is present in the to-be-trained image

101

Obtain first prediction class annotation information of the to-be-trained image by using a to-be-trained image classification network in a case that a first model parameter of a to-be-trained offset network is fixed, the to-be-trained offset network being used for classifying the image based on an offset variable, the to-be-trained image classification network being used for classifying image content in the image

102

Determine a second model parameter corresponding to the to-be-trained image classification network by using a classification loss function based on the image content class information and the first prediction class annotation information

103

Obtain second prediction class annotation information of the to-be-trained image by using the to-be-trained offset network in a case that the second model parameter of the to-be-trained image classification network is fixed

104

Determine a third model parameter corresponding to the to-be-trained offset network by using the classification loss function based on the image content class information and the second prediction class annotation information

105

Train a to-be-trained semantic image segmentation network model based on the second model parameter and the third model parameter, to obtain a semantic image segmentation network model, the semantic image segmentation network model being used for determining a semantic segmentation result of a to-be-processed image

Offset network 42

Offset variable 44

Image classification network 41

To-be-trained image 43

51

52

Convolutional layer

Offset region

2N

Offset variable

53

Deformable convolutional neural network

Inputted to-be-trained image

Outputted to-be-trained feature image

TRAINING SEMANTIC IMAGE SEGMENTATION MODEL COMPRISING DEFORMABLE CONVOLUTIONAL NEURAL NETWORK

CROSS-REFERENCE TO RELATED APPLICATION(S)

This application is a bypass continuation application of International Application No. PCT/CN2020/079496, entitled "IMAGE CLASSIFICATION MODEL TRAINING METHOD, AND IMAGE PROCESSING METHOD AND DEVICE" and filed on Mar. 16, 2020, which claims priority to Chinese Patent Application No. 201910233985.5, entitled "METHOD FOR TRAINING IMAGE CLASSIFICATION MODEL, IMAGE PROCESSING METHOD, AND APPARATUSES" and filed with the Chinese Patent Office on Mar. 26, 2019, the disclosures of which are herein incorporated by reference in their entireties.

FIELD

The disclosure relates to the field of artificial intelligence (AI), and in particular, to a method for training an image classification model, an image processing method, and apparatuses.

BACKGROUND

Semantic image segmentation is the cornerstone technology for image understanding, and plays an important role in automated driving systems (for example, street view recognition and understanding), unmanned aerial vehicle applications (for example, landing point determination), and wearable device applications. An image is formed by many pixels, and semantic segmentation is the segmentation of the pixels based on different semantic meanings expressed in the image, to enable a machine to automatically segment and recognize content in the image.

At present, a deep convolutional neural network is generally trained to implement full-image classification. A corresponding image content region in an image is then located based on the deep convolutional neural network. These image content regions annotated through full-image classification are then used as segmented supervised information. Finally, training is performed to obtain a semantic image segmentation network model.

However, during the training of the semantic image segmentation network model, images to be trained require pixel-level annotation. An image with a resolution of 1024× 2048 is used as an example. It would normally take about 1.5 hours to manually perform pixel-level annotation on an image with such resolution. Therefore, the costs of manual annotation are excessively high, resulting in relatively low efficiency of model training.

SUMMARY

Embodiments of the disclosure provide a method for training an image classification model, an image processing method, and apparatuses. Images annotated on an image level may be trained, so that while the performance of a semantic image segmentation network model is ensured, manual pixel-level annotation is not required, to reduce the costs of manual annotation, thereby improving the efficiency of model training.

According to an aspect of an example embodiment of the disclosure, provided is a method for training an image classification model, performed by a computer device, and including:

obtaining a first image having class annotation information, the class annotation information representing image content class information of an image content that is included in the first image;

obtaining first prediction class annotation information of the first image by using an image classification network based on a first model parameter of an offset network being fixed, the offset network being configured to classify the first image based on an offset variable, the image classification network being configured to classify the image content in the first image;

determining a second model parameter corresponding to the image classification network by using a classification loss function based on the image content class information and the first prediction class annotation information;

obtaining second prediction class annotation information of the first image by using the offset network based on the second model parameter of the image classification network being fixed;

determining a third model parameter corresponding to the offset network by using the classification loss function based on the image content class information and the second prediction class annotation information; and training a semantic image segmentation network model based on the second model parameter and the third model parameter, to obtain a final semantic image segmentation network model configured to determine a semantic segmentation result of a second image.

The determining the second model parameter may include:

determining a prediction probability value corresponding to each class based on the image content class information and the first prediction class annotation information;

determining a classification loss of the classification loss function based on the prediction probability value corresponding to the each class; and determining the second model parameter corresponding to the image classification network based on the classification loss of the classification loss function being minimum.

The determining the third model parameter may include:

determining a prediction probability value corresponding to each class based on the image content class information and the second prediction class annotation information;

determining a classification loss of the classification loss function based on the prediction probability value corresponding to the each class; and determining the third model parameter corresponding to the offset network based on the classification loss of the classification loss function being maximum.

The classification loss function may be represented as:

wherein L represents the classification loss function, I( ) represents a Dirac function, N represents a total quantity of classes, c represents a $c^{th}$ class, k is greater than or equal to 1 and less than or equal to N, and $P_c$ represents a prediction probability value corresponding to the $c^{th}$ class.

The obtaining the second prediction class annotation information may include:

obtaining a feature image corresponding to the first image by using a deformable convolutional neural network, the deformable convolutional neural network being configured to predict the offset variable of the first image; and obtaining the second prediction class annotation information corresponding to the feature image by using the offset network.

The obtaining the feature image may include generating the feature image in the following manner:

$$y(p_0) = \sum_{p_n \in R} w(p_n) \times (p_0 + p_n + \Delta p_n),$$

wherein $y(p_0)$ represents the feature image, $p_0$ represents a pixel value in the feature image, $p_n$ represents a position of a sampling point in a convolutional kernel, $\Delta p_n$ represents the offset variable, $w(p_n)$ represents a weight value for performing a convolution in the convolutional kernel at a corresponding position in the first image, and $x(p_0+p_n+\Delta p_n)$ represents a pixel value at the corresponding position in the first image.

The method may further include, after the determining the third model parameter:

obtaining third prediction class annotation information of the first image by using the image classification network based on the third model parameter corresponding to the offset network being fixed;

determining a fourth model parameter corresponding to the image classification network by using the classification loss function based on the image content class information and the third prediction class annotation information;

obtaining fourth prediction class annotation information of the first image by using the offset network based on the fourth model parameter of the image classification network being fixed; and determining a fifth model parameter corresponding to the offset network by using the classification loss function based on the image content class information and the fourth prediction class annotation information; and the training the semantic image segmentation network model may include:

training the semantic image segmentation network model based on the second model parameter, the third model parameter, the fourth model parameter, and the fifth model parameter, to obtain the final semantic image segmentation network model.

The training the semantic image segmentation network model may include:

determining an image content region corresponding to the first image based on an offset variable for training the offset network each time of training the offset network, the offset network being trained N times by using the second model parameter and the third model parameter, N being an integer greater than or equal to 1;

training the semantic image segmentation network model by using a target loss function based on the image content region; and generating the semantic image segmentation network model based on a loss result of the target loss function being minimum.

The target loss function may be represented as:

$$L_{seg} = -\sum_{k=1}^{N} \sum_{i,j} I(c = k) \log P_c^{i,j},$$

wherein $L_{seg}$ represents the target loss function, N represents a total quantity of classes, c represents a $c^{th}$ class, k is greater than or equal to 1 and less than or equal to N, I( ) represents a Dirac function, $$P_c^{i,j}$$

represents a prediction probability value of the $c^{th}$ class at a pixel point, i represents a horizontal coordinate position of the pixel point in the first image, and j represents a vertical coordinate position of the pixel point in the first image.

According to an aspect of an example embodiment of the disclosure, provided is an image processing method, performed by a computer device, and including:

obtaining a semantic segmentation result of an image by using a semantic image segmentation network model, the semantic image segmentation network model being obtained based on alternate training of an image classification network and an offset network, the offset network being configured to classify the image based on an offset variable, the image classification network being configured to classify image content in the image; and processing the image based on the semantic segmentation result.

According to an aspect of an example embodiment of the disclosure, provided is a model training apparatus, applicable to a computer device, and including:

at least one memory configured to store program code; and at least one processor configured to read the program code and operate as instructed by the program code, the program code including:

first obtaining code configured to cause at least one of the at least one processor to obtain a first image having class annotation information, the class annotation information representing image content class information of an image content that is included in the first image;

second obtaining code configured to cause at least one of the at least one processor to obtain first prediction class annotation information of the first image by using an image classification network based on a first model parameter of an offset network being fixed, the offset network being configured to classify the first image based on an offset variable, the image classification network being configured to classify the image content in the first image;

first determining code configured to cause at least one of the at least one processor to determine a second model parameter corresponding to the image classification network by using a classification loss function based on the image content class information and the first prediction class annotation information;

third obtaining code configured to cause at least one of the at least one processor to obtain second prediction class annotation information of the first image by using the offset network based on the second model parameter of the image classification network being fixed;

second determining code configured to cause at least one of the at least one processor to determine a third model parameter corresponding to the offset network by using the classification loss function based on the image content class information and the second prediction class annotation information; and training code configured to cause at least one of the at least one processor to train a semantic image segmentation network model based on the second model parameter and the third model parameter, to obtain a final semantic image segmentation network model that is used for determining a semantic segmentation result of a second image.

The first determining code may be further configured to cause at least one of the at least one processor to determine a prediction probability value corresponding to each class based on the image content class information and the first prediction class annotation information; determine a classification loss of the classification loss function based on the prediction probability value corresponding to the each class; and determine the second model parameter corresponding to the image classification network based on the classification loss of the classification loss function being minimum.

The second determining code may be further configured to cause at least one of the at least one processor to determine a prediction probability value corresponding to each class based on the image content class information and the second prediction class annotation information; determine a classification loss of the classification loss function based on the prediction probability value corresponding to the each class; and determine the third model parameter corresponding to the offset network based on the classification loss of the classification loss function being maximum.

The classification loss function may be represented as:

$$L = -\sum\nolimits_{k=1}^{N} I(c = k)\log P_c,$$

wherein L represents the classification loss function, I( ) represents a Dirac function, N represents a total quantity of classes, c represents a $c^{th}$ class, k is greater than or equal to 1 and less than or equal to N, and $P_c$ represents a prediction probability value corresponding to the $c^{th}$ class.

The third obtaining code may be further configured to cause at least one of the at least one processor to obtain a feature image corresponding to the first image by using a deformable convolutional neural network, the deformable convolutional neural network being configured to predict the offset variable of the first image; and obtain the second prediction class annotation information corresponding to the feature image by using the offset network.

The third obtaining code nay be further configured to cause at least one of the at least one processor to generate the feature image in the following manner:

$$y(p_0) = \sum_{p_n \in R} w(p_n) \times (p_0 + p_n + \Delta p_n),$$

wherein $y(p_0)$ represents the feature image, $p_0$ represents a pixel value in the feature image, $p_n$ represents a position of a sampling point in a convolutional kernel, $\Delta p_n$ represents the offset variable, $w(p_n)$ represents a weight value for performing a convolution in the convolutional kernel at a corresponding position in the first image, and $x(p_0+p_n+\Delta p_n)$ represents a pixel value at the corresponding position in the first image.

According to an aspect of an example embodiment of the disclosure, provided is a server, including a memory, and a processor, the memory being configured to store a program; and the processor being configured to execute the program in the memory to perform operations of the foregoing method(s).

According to an aspect of an example embodiment of the disclosure, provided is a terminal device, including: a memory, and a processor, the memory being configured to store a program; and the processor being configured to execute the program in the memory to perform operations of the foregoing method(s).

According to an aspect of an example embodiment of the disclosure, provided is a non-transitory computer-readable storage medium, including instructions, the instructions, when run on a computer, causing the computer to perform the foregoing method(s).

According to an aspect of an example embodiment of the disclosure, provided is a non-transitory computer-readable storage medium, including instructions, the instructions, when run on a computer, causing the computer to perform the foregoing method(s).

BRIEF DESCRIPTION OF THE DRAWINGS

The above and/or other aspects will become apparent and more readily appreciated by describing certain example embodiments with reference to the accompanying drawings.

FIG. 3 is a schematic diagram of an embodiment of a method for training an image classification model according to an example embodiment of the disclosure.

DETAILED DESCRIPTION

Figure 1:
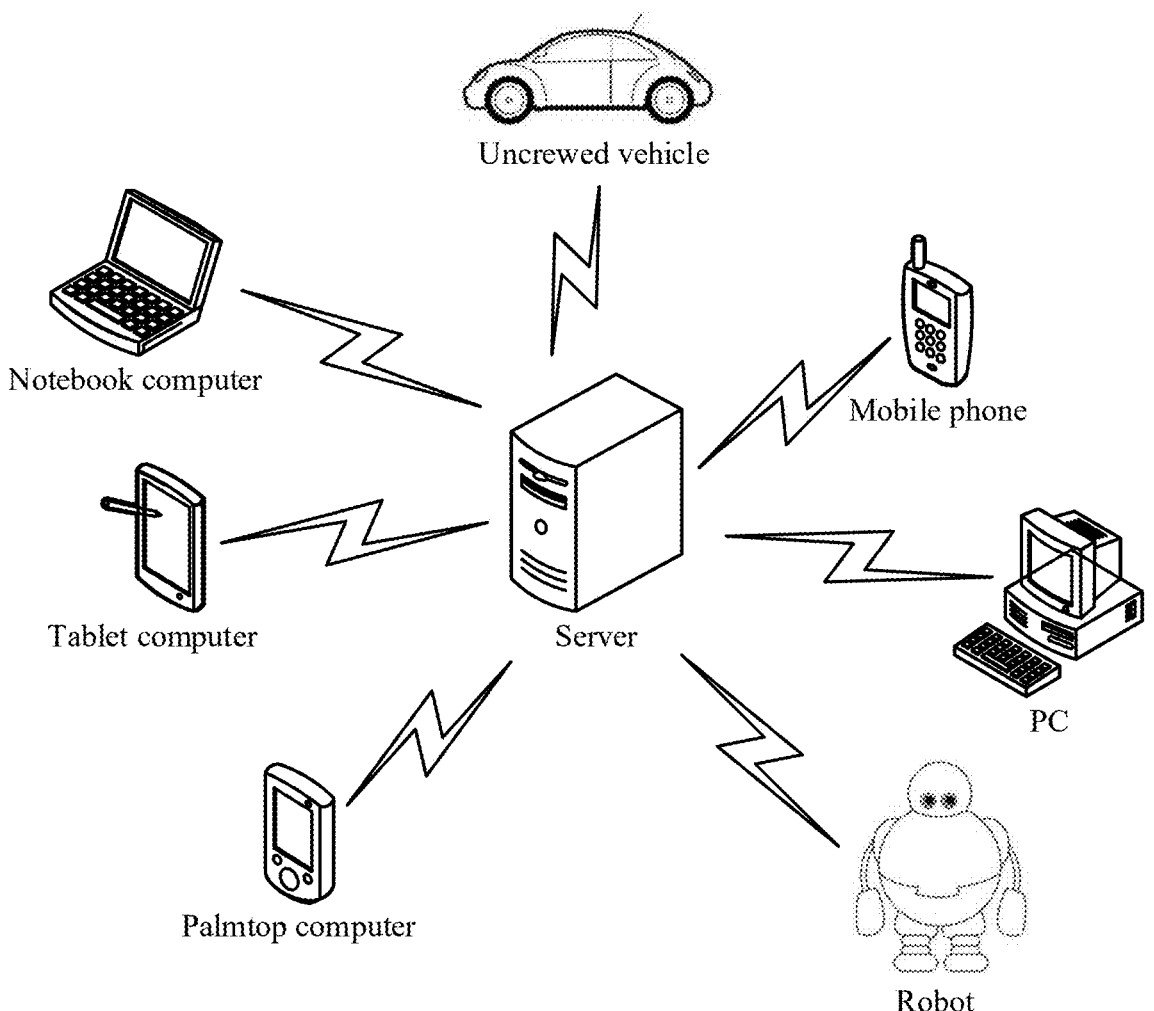
FIG. 1 is a schematic architectural diagram of an image processing system according to an example embodiment of the disclosure.

Embodiments of the disclosure provide a method for training an image classification model, an image processing method, and apparatuses. Images annotated on an image level may be trained, so that while the performance of a semantic image segmentation network model is ensured, manual pixel-level annotation is not required, to reduce the costs of manual annotation, thereby improving the efficiency of model training.

In the specification, claims, and accompanying drawings of the disclosure, the terms "first", "second", "third", "fourth", and the like (if existing) are intended to distinguish between similar objects rather than describe a specific sequence or a precedence order. It is to be understood that data used in this way is exchangeable in a proper case, so that the embodiments of the disclosure described herein may be implemented in an order different from the order shown or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that the disclosure provides a method for training a semantic image segmentation network model and an image processing method using the semantic image segmentation network model. The method may use artificial intelligence (AI) to reduce manual annotation in a model training process for semantic image segmentation, thereby improving the efficiency of model training.

AI is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that may react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. The basic AI technology generally includes technologies such as a sensor, a dedicated AI chip, cloud computing, distributed storage, a big data processing technology, an operating/interaction system, and electromechanical integration. AI software technologies mainly include several major directions such as a computer vision (CV) technology, an audio processing technology, a natural language processing technology, and machine learning (ML)/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that may obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a three dimensional (3D) technology, virtual reality, augmented reality, synchronous positioning, or map construction, and further include biological feature recognition technologies such as common face recognition and fingerprint recognition.

ML is a multi-disciplinary subject involving a plurality of disciplines such as probability theory, statistics, approximation theory, convex analysis, and algorithm complexity theory. The ML specializes in studying how a computer simulates or implements a human learning behavior to obtain new knowledge or skills, and reorganize an existing knowledge structure, so as to keep improving its performance. The ML is a core of the AI, is a basic way to make the computer intelligent, and is applied to various fields of the AI. The ML and deep learning generally include technologies such as an artificial neural network, a belief network, reinforcement learning, transfer learning, inductive learning, and learning from demonstrations.

The method provided in the disclosure is mainly applied to the field of CV in the field of AI. In the field of CV, segmentation, detection, recognition, and tracking are closely related. Different from a conventional image segmentation problem based on features such as grayscale, color, texture, and shape, semantic image segmentation is to understand an image on a pixel level, and a target class corresponding to each pixel in an image needs to be determined. Classes have an excessive requirement for algorithm precision. The understanding of image content by a computer may develop from giving a semantic label (image class) to an entire image to drawing the position of image content that appears in an image. Furthermore, it is necessary to enable the computer to understand semantic information of each pixel point in the image, so that the computer may see an image like a person, that is, perform semantic image segmentation.

Different from image classification and image content detection, an objective of semantic image segmentation is to annotate each pixel point in an image with one label. For ease of understanding, semantic segmentation is a very important field in CV and is to recognize an image on a pixel level, that is, to annotate an object class to which each pixel in an image belongs. The image processing method provided based on the disclosure may be applied to an automated driving scenario. That is, necessary perception needs to be added to a vehicle, to learn about an environment in which the vehicle is located, to enable an automated vehicle to travel safely. The method may also be applied to medical image diagnosis. A machine may enhance the analysis by a radiologist, thereby greatly reducing the time required for running a diagnosis test. For example, a heart region and a lung region may be obtained by segmenting a chest X-ray image.

For ease of understanding, the disclosure provides an image processing method. The method is applied to an image processing system shown in FIG. 1. FIG. 1 is a schematic architectural diagram of an image processing system according to an example embodiment of the disclosure. As shown in the figure, a model training apparatus provided in the disclosure may be deployed on a server. The image processing apparatus may be deployed on a client. Optionally, the image processing apparatus may be alternatively deployed on a server. An example in which the image processing apparatus is deployed on a client is used as an example for description herein. First, a server trains a deformable convolutional neural network to implement full-image classification. Next, the server uses an adversarial learning strategy to enable a backbone network (that is, an image classification network) and a branch network (that is, an offset network) to perform alternate training. During the training of the offset network each time, the server updates the branch network by using a gradient generated by increasing a classification loss function to enable the branch network to gradually find a region that makes relatively weak contribution to full-image classification, to obtain an image content region of target image content. Finally, the located image content region is used as segmented supervised information. Therefore, one semantic image segmentation network model is obtained through training, to implement image segmentation.

When the client is connected to the server, the client may download the semantic image segmentation network model from the server, to further input an into the semantic image segmentation network model. The semantic image segmentation network model is used to output a semantic segmentation result of the image. Alternatively, the client may upload an image to the server, and the server processes the image by using the semantic image segmentation network model, to obtain a semantic segmentation result and return a voice segmentation result to the client. When the client is not connected to the server, the server may directly process an image at the backend by using the semantic image segmentation network model, to obtain a semantic segmentation result.

The client may be deployed on a terminal device. The terminal device includes, but is not limited to, an uncrewed vehicle, a robot, a tablet computer, a notebook computer, a palmtop computer, a mobile phone, a voice interaction device, and a personal computer (PC), and is not limited herein.

Figure 2:
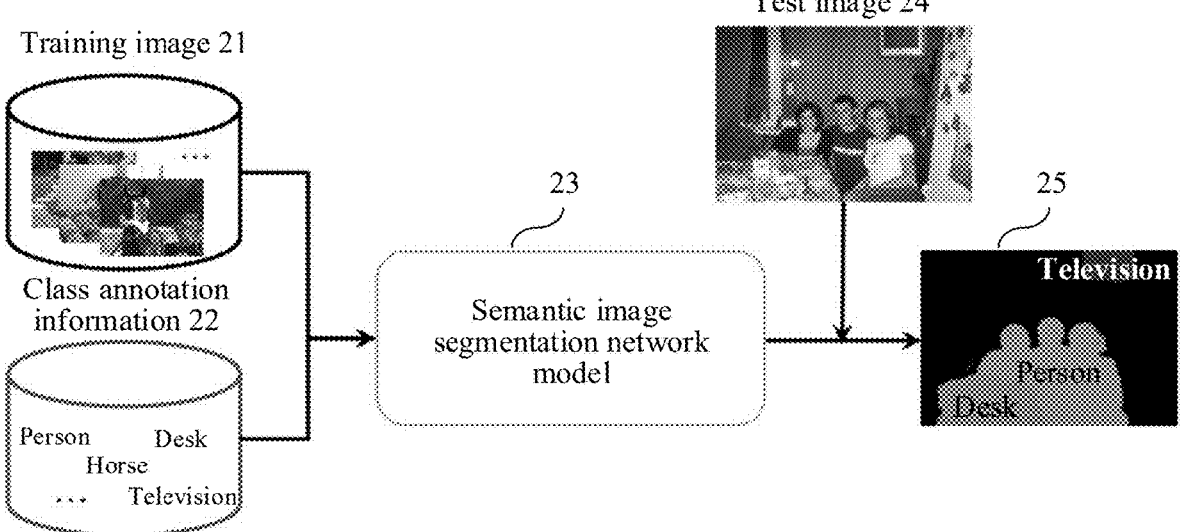
FIG. 2 is a schematic diagram of a procedural framework of a semantic image segmentation network model according to an example embodiment of the disclosure.

For ease of understanding, FIG. 2 is a schematic diagram of a procedural framework of a semantic image segmentation network model according to an example embodiment of the disclosure. As shown in the figure, a training image 21 and class annotation information 22 on an image level are first obtained. A weakly-supervised semantic image segmentation network model 23 is then obtained by training the training image 21 and the class annotation information 22. Next, an unknown test image 24 is obtained, and the test image 24 is inputted into the semantic image segmentation network model 23. The semantic image segmentation network model 23 segments the unknown test image 24, to predict a semantic segmentation result 25 of the test image 24.

With reference to the foregoing description, a method for training an image classification model in the disclosure is described below. The method may be performed by a computer device, for example, may be performed by a model training apparatus in the computer device. The computer device may be a server in the foregoing system shown in FIG. 1. Referring to FIG. 3, an embodiment of a method for training an image classification model in this example embodiment of the disclosure includes the following operations 101-106:

101. Obtain an image to be trained, which includes class annotation information, the class annotation information being used for representing image content class information that is present in the image (e.g., representing each class of an object or a scene that is present in the image).

In this embodiment, the model training apparatus first needs to obtain an image to be processed. The image has class annotation information. The class annotation information is used for representing image content class information of image content that is present in the image. For example, image content class information such as "person", "horse", "television", and "couch" is annotated in the image. Optionally, apart from class information corresponding to an object in the image, the image content class information may be class information corresponding to a scene such as sky, cloud, lawn, and sea in the image.

In an example, an image may be downloaded from a database, and the image is then annotated in a manual annotation manner, to obtain class annotation information of the image. A website having massive user data may be automatically crawled to obtain an image with class annotation information. It would be understood that the image includes, but is not only limited to, the following formats: a bitmap (BMP) format, a Picture exchange (PCX) format, a Tagged Image File Format (TIF), a Graphics Interchange Format (GIF), a Joint Photographic Experts Group (JPEG) format, an exchangeable image file format (EXIF), a Scalable Vector Graphics (SVG) format, a Drawing Exchange Format (DXF), an Encapsulated PostScript (EPS) format, a Portable Network Graphics (PNG) format, a High Dynamic Range Imaging (HDRI) format, and a Windows Metafile (WMF) format.

During a crawl on a website to obtain an image, the image may exist in a format such as a HyperText Markup Language (HTML) format, a picture format, a document (Doc) format, a multimedia format, a dynamic web page format, or a Portable Document Format (PDF).

102. Obtain first prediction class annotation information of the image by using an image classification network when a first model parameter of an offset network is fixed, the offset network being used for classifying the image based on an offset variable, the image classification network being used for classifying image content in the image.

Figure 4:
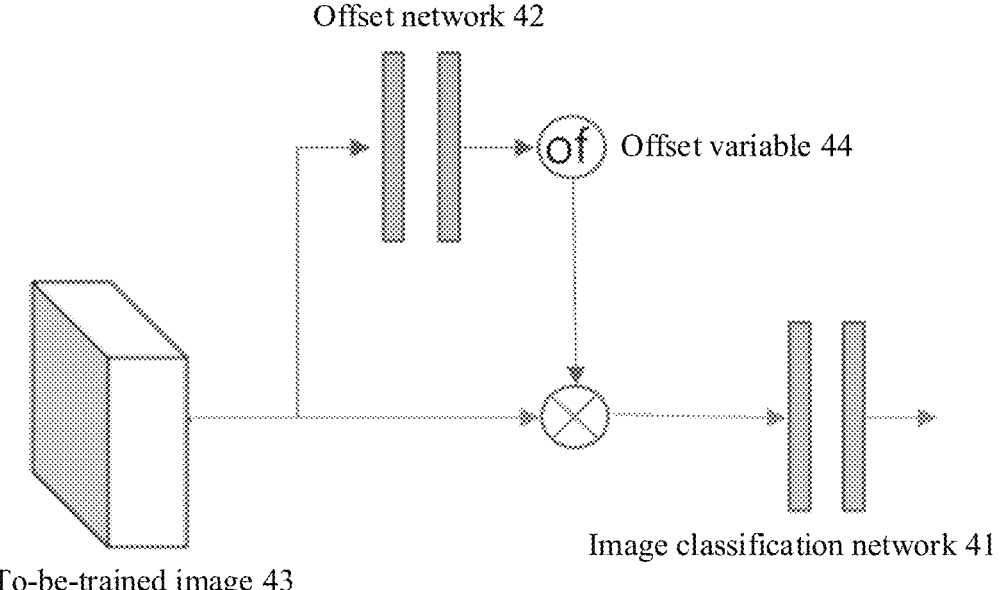
FIG. 4 is a schematic structural diagram of an offset network and an image classification network according to an example embodiment of the disclosure.

In this embodiment, after obtaining the image and the class annotation information corresponding to the image, the model training apparatus starts to alternately train the image classification network and the offset network. For example, FIG. 4 is a schematic structural diagram of an offset network and an image classification network according to an example embodiment of the disclosure. As shown in the figure, during the training of an image classification network 41, a weight value of an offset network 42 needs to be fixed first. That is, a first model parameter of the offset network 42 is fixed. An image 43 is then inputted into the image classification network 41. The image classification network 41 outputs first prediction class annotation information of the image 43.

The offset network 42 is configured to provide an input point position that has relatively weak contribution to classification. Based on a changed offset variable 44 (which will be described below), an objective of locating an image content region with relatively low discriminativeness may be achieved. The image classification network 41 is configured to classify an image content region in an entire image.

103. Determine a second model parameter corresponding to the image classification network by using a classification loss function based on the image content class information and the first prediction class annotation information.

In this embodiment, the model training apparatus trains the image classification network by using a classification loss function. The classification loss function is used for estimating a degree of inconsistency between a model prediction value and an actual value. The image content class information of the image is an actual value (e.g., the class of an object or a scene that is annotated in the image). The first prediction class annotation information of the image is a predicted value (e.g., a predicted class of an object or a scene included in the image). When the classification loss function is smaller, it represents that the image classification network is more robust. In this case, the second model parameter corresponding to the image classification network may be obtained according to the classification loss function.

104. Obtain second prediction class annotation information of the image by using the offset network when the second model parameter of the image classification network is fixed.

In this embodiment, after obtaining the second model parameter of the image classification network through training, the model training apparatus performs model-based alternate training. In this case, a weight value of the image classification network needs to be fixed. That is, the second model parameter of the image classification network is fixed. The image is then inputted into the offset network. The offset network outputs the second prediction class annotation information of the image.

It would be understood that, during the alternate training of the image classification network and the offset network, the model parameter of the offset network may be fixed first. The image classification network is then trained. Alternatively, a model parameter of the image classification network may be fixed first. The offset network is then trained. In the disclosure, an example in which the model parameter of the offset network is fixed first and the image classification network is then trained is used for description. However, this is not to be understood as a limitation to the disclosure.

105. Determine a third model parameter corresponding to the offset network by using the classification loss function based on the image content class information and the second prediction class annotation information.

In this embodiment, the model training apparatus trains the offset network by using one same classification loss function. The classification loss function is used for estimating a degree of inconsistency between a model prediction value and an actual value. The image content class information of the image is an actual value. The second prediction class annotation information of the image is a predicted value. In this case, the third model parameter corresponding to the offset network may be obtained based on the classification loss function.

106. Train a to-be-trained semantic (or a semantic image segmentation network model to be trained) based on the second model parameter and the third model parameter, to obtain a semantic image segmentation network model, the semantic image segmentation network model being used for determining a semantic segmentation result of an image.

In this embodiment, after at least one round of alternate training, the model training apparatus trains the semantic image segmentation network model based on model parameters (including the second model parameter and the third model parameter obtained through training) obtained in each round of training. In an example embodiment, after the alternate training ends, offset variables predicted in a training process of the offset network are fused into one image content region. Finally, the obtained image content region is used as pixel-level segmented supervised information. The semantic image segmentation network model is trained by using the supervised information. When the image is inputted into the semantic image segmentation network model, the semantic image segmentation network model outputs a corresponding semantic segmentation result.

Supervised learning is mainly used for resolving two types of problems, namely, regression and classification. The regression corresponds to a quantitative output, and the classification corresponds to a qualitative output. To put it simply, the calculation of known data to obtain a specific value is regression. For example, $y=f(x)$ is a typical regression relationship. The calculation of known data or annotated data to obtain one class is classification.

In this example embodiment of the disclosure, in the foregoing manner, images annotated on an image level may be trained by using an offset network and an image classification network, so that while the performance of a semantic image segmentation network model is ensured, manual pixel-level annotation is not required, to reduce the costs of manual annotation, thereby improving the efficiency of model training.

Optionally, based on the foregoing embodiment corresponding to FIG. 3, in a first example embodiment of the method for training an image classification model provided in this embodiment of the disclosure, the determining a second model parameter corresponding to the image classification network by using a classification loss function based on the image content class information and the first prediction class annotation information includes:

determining a prediction probability value corresponding to each class based on the image content class information and the first prediction class annotation information;

determining a classification loss of the classification loss function based on the prediction probability value corresponding to the each class; and determining the second model parameter corresponding to the image classification network when the classification loss of the classification loss function is minimum.

In this embodiment, a method for determining the second model parameter is described. First, a prediction probability value corresponding to each class is determined based on an actual value (that is, the image content class information of the image) and a predicted value (that is, the first prediction class annotation information of the image). It is assumed that there are five classes, namely, "person", "horse", "refrigerator", "television", and "couch". The first prediction class annotation information includes information of "person", "refrigerator", "horse", "television", and "couch", and prediction probability values may be obtained as follows: A prediction probability value of "person" is 0.93, a prediction probability value of "refrigerator" is 0.88, a prediction probability value of "horse" is 0, a prediction probability value of "television" is 0.5, and a prediction probability value of "couch" is 0.65. Next, a classification loss of the classification loss function is determined based on the prediction probability value corresponding to the each class.

When the classification loss of the classification loss function reaches a minimum value, a model parameter corresponding to the image classification network based on the minimum value may be obtained. The model parameter is the second model parameter corresponding to the offset network. It would be understood that a classification loss of the classification loss function in the disclosure may be a cross-entropy classification loss.

Next, in this example embodiment of the disclosure, in the foregoing manner, a classification loss of a classification loss function on an image level is minimized, an image classification network having a full-image classification capability may be obtained, and the image classification network has relatively adequate robustness and has a better image classification effect.

Optionally, based on the foregoing embodiment corresponding to FIG. 3, in a second example embodiment of the method for training an image classification model provided in this embodiment of the disclosure, the determining a third model parameter corresponding to the offset network by using the classification loss function based on the image content class information and the second prediction class annotation information includes:

determining a prediction probability value corresponding to each class based on the image content class information and the second prediction class annotation information;

determining a classification loss of the classification loss function based on the prediction probability value corresponding to the each class; and determining the third model parameter corresponding to the offset network when the classification loss of the classification loss function is maximum.

In this embodiment, a method for determining the third model parameter is described. First, a prediction probability value corresponding to each class is determined based on an actual value (that is, the image content class information of the image) and a predicted value (that is, the second prediction class annotation information of the image). The second prediction class annotation information herein is obtained after processing by a deformable convolutional neural network. It is assumed that there are five classes, namely, "person", "horse", "refrigerator", "television", and "couch". The second prediction class annotation information includes "person", "horse", "refrigerator", "television", and "couch", and prediction probability values may be obtained as follows: A prediction probability value of "person" is 0.75, a prediction probability value of "horse" is 0.19, a prediction probability value of "refrigerator" is 0.66, a prediction probability value of "television" is 0.43, and a prediction probability value of "couch" is 0.78. Next, a classification loss of the classification loss function is determined based on the prediction probability value corresponding to the each class.

When the classification loss of the classification loss function reaches a maximum value, a model parameter corresponding to the offset network based on the maximum value may be obtained. The model parameter is the third model parameter corresponding to the offset network. It would be understood that a classification loss of the classification loss function in the disclosure may be a cross-entropy classification loss.

In an embodiment, time sequences or images may be consecutive. Data inputted into a model is generally non-consecutive. Therefore, slight disturbance may be added to an input to enable the model to better counteract noise disturbance. That is, an adversarial sample is obtained and is classified as much as possible, and the adversarial sample is also very close to an original sample in sample space (the distance between the two is infinitely small). It would be understood that calculation may be performed by using a gradient descent method, a Newton's method or the like to obtain a model parameter.

Next, in this example embodiment of the disclosure, in the foregoing manner, the classification loss of the classification loss function on an image level is maximized, so that the classification difficulty of the image classification network may be improved (or eased), and adversarial training is implemented, to enable the image classification network to have a better classification effect, that is, a better image classification effect. In addition, the classification loss of the classification loss function on an image level is maximized, so that the offset network may provide an input point position that has relatively weak contribution to classification. Based on a changed offset variable, an objective of locating an image content region with relatively low discriminativeness is achieved.

Optionally, based on the foregoing embodiment corresponding to FIG. 3 and the first or second embodiment corresponding to FIG. 3, in a third example embodiment of the method for training an image classification model provided in this embodiment of the disclosure, the classification loss function may be represented as:

$$L = -\sum_{k=1}^{N} I(c = k)\log P_c,$$

where L represents the classification loss function, I( ) represents a Dirac function, N represents a total quantity of classes, c represents a $c^{th}$ class, k is greater than or equal to 1 and less than or equal to N, and $P_c$ represents a prediction probability value corresponding to the $c^{th}$ class.

In this embodiment, a classification loss function used for performing training to obtain an image classification network and an offset network is defined. That is, the following classification loss function is used:

$$L = -\sum_{k=1}^{N} I(c = k)\log P_c.$$

Accordingly, during the training of an image classification network and an offset network, an image content region on an image level is used as a training object, so that an obtained image classification network and offset network may predict the class of each image content region in an image.

Next, in this example embodiment of the disclosure, exemplary content of the classification loss function is provided. In the foregoing manner, a feasible method may be provided for the implementation of the solution, thereby improving the feasibility and operability of the solution.

Optionally, based on the embodiment(s) corresponding to FIG. 3, in a fourth example embodiment of the method for training an image classification model provided in this example embodiment of the disclosure, before the obtaining second prediction class annotation information of the image by using the offset network, the method may further include:

obtaining a feature image corresponding to the image by using a deformable convolutional neural network, the deformable convolutional neural network being used for predicting an offset variable of the image; and the obtaining second prediction class annotation information of the image by using the offset network may include:

obtaining the second prediction class annotation information corresponding to the feature image by using the offset network.

In this embodiment, the generating the second prediction class annotation information by using the deformable convolutional neural network is described. In an example embodiment, an image is first inputted into the deformable convolutional neural network (deformable convolution). The deformable convolutional neural network outputs an offset variable obtained through prediction. The offset variable is a position offset of an input pixel corresponding to each weight value of a convolutional kernel. An actual input feature of an operation may be changed by using the offset variable.

Figure 5:
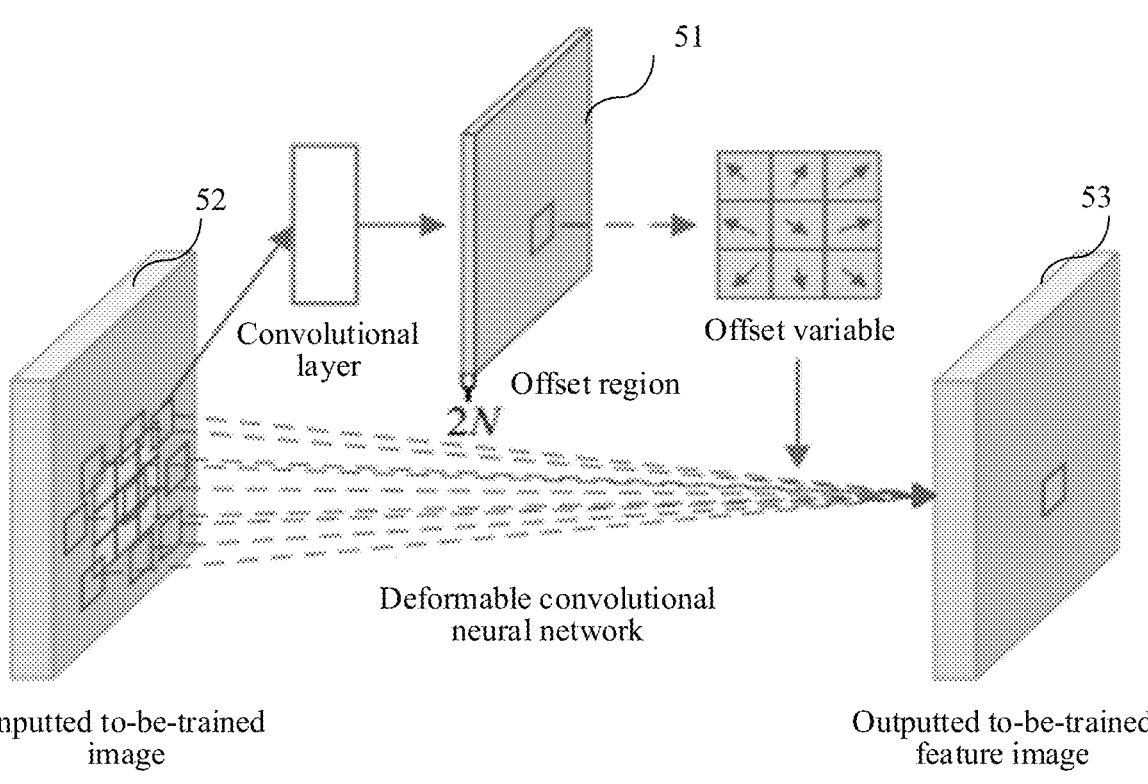
FIG. 5 is a schematic structural diagram of a deformable convolutional neural network according to an example embodiment of the disclosure.

For ease of understanding, FIG. 5 is a schematic structural diagram of a deformable convolutional neural network according to an example embodiment of the disclosure. As shown in the figure, for conventional convolutional windows, it only needs to train a pixel weight value of each convolutional window. Some parameters need to be additionally added to the deformable convolutional network to the shape of the training convolutional window. An offset region 51 in FIG. 5 is a parameter (to be trained) additionally added to deformable convolution. The value of the parameter is the same as the value of an image 52 (to be trained). The convolutional window slides in the offset region 51 to present an effect of a convolutional pixel offset, to implement sampling point optimization, and finally outputs a feature image 53. The feature image 53 is inputted into the offset network (to be trained). The offset network outputs the second prediction class annotation information.

Next, in this example embodiment of the disclosure, in the foregoing manner, a position offset variable of an input pixel corresponding to each weight in one convolutional kernel may be predicted, to change an actual input feature of convolutional operation, and training is performed to obtain the most effective transformation manner, so that an adversarial training mode may be implemented.

Optionally, based on the fourth embodiment corresponding to FIG. 3, in a fifth example embodiment of the method for training an image classification model provided in this embodiment of the disclosure, the obtaining a feature image corresponding to the image by using a deformable convolutional neural network may include:

generating the feature image to be trained in the following manner:

$$y(p_0) = \sum_{p_n \in R} w(p_n)x(p_0 + p_n + \Delta p_n),$$

where $y(p_0)$ represents the feature image, $p_0$ represents a pixel value in the feature image, $p_n$ represents a position of a sampling point in a convolutional kernel, $\Delta p_n$ represents the offset variable, $w(p_n)$ represents a weight value for performing a convolution in the convolutional kernel at a corresponding position in the image, and $x(p_0+p_n+\Delta p_n)$ represents a pixel value at the corresponding position in the image.

In this embodiment, the method for obtaining the feature image by using the deformable convolutional neural network is described. For a feature with an output position of $p_0$, if a conventional convolutional layer is used, and an input feature position set corresponding to the convolutional layer is $p_0+p_n$, where $p_n \in R$, and R is all standard square offsets with 0 as the center. For example, R corresponding to one 3×3 convolutional kernel is {(0, 0), (−1, −1), (−1, 1), (1, 1), (1, −1), (−1, 0), (1, 0), (0, 1), (1,0)}. An additional offset variable obtained through prediction is introduced into an input feature set of the deformable convolutional neural network based on $p_0+p_n$. Therefore, an actual inputted feature position set is $p_0+p_n+\Delta p_n$. That is, the output layer $y(p_0)$ is represented as:

$$y(p_0) = \sum_{p_n \in R} w(p_n)x(p_0 + p_n + \Delta p_n),$$

where represents the feature image, $p_0$ represents a pixel value in the $y(p_0)$ feature image, $p_n$ represents a position of a sampling point in a convolutional kernel, $\Delta p_n$ represents the offset variable, $w(p_n)$ represents a weight value for performing a convolution in the convolutional kernel at a corresponding position in the image, and $x(p_0+p_n+\Delta p_n)$ represents a pixel value at the corresponding position in the image.

Next, in this example embodiment of the disclosure, generating the feature image may be performed in the foregoing manner. In the foregoing manner, a feasible method may be provided for the implementation of the solution, thereby improving the feasibility and operability of the solution.

Optionally, based on the foregoing embodiment(s) corresponding to FIG. 3, in a sixth example embodiment of the method for training an image classification model provided in this embodiment of the disclosure, after the determining a third model parameter corresponding to the offset network by using the classification loss function based on the image content class information and the second prediction class annotation information, the method may further include:

obtaining third prediction class annotation information of the image by using the image classification network when the third model parameter corresponding to the offset network is fixed;

determining a fourth model parameter corresponding to the image classification network by using the classification loss function based on the image content class information and the third prediction class annotation information;

obtaining fourth prediction class annotation information of the image by using the offset network when the fourth model parameter of the image classification network is fixed; and determining a fifth model parameter corresponding to the offset network by using the classification loss function based on the image content class information and the fourth prediction class annotation information; and the training a semantic image segmentation network model based on the second model parameter and the third model parameter, to obtain a final semantic image segmentation network model includes:

training the semantic image segmentation network model based on the second model parameter, the third model parameter, the fourth model parameter, and the fifth model parameter, to obtain the final semantic image segmentation network model.

In this embodiment, another round of alternate training process of models is described. After completing alternate training once, the model training apparatus may start a next round of condition training. During the training of an image classification network, a weight value of an offset network needs to be fixed first. That is, a third model parameter of the offset network is fixed. An image is then inputted into the image classification network. The image classification network outputs third prediction class annotation information of the image. In this case, the model training apparatus trains the image classification network by using a classification loss function. The classification loss function is used for estimating a degree of inconsistency between a model prediction value and an actual value. Image content class information of the image is an actual value. The third prediction class annotation information of the image is a predicted value. When the classification loss function is smaller, it represents that the image classification network is more robust. In this case, a fourth model parameter corresponding to the image classification network may be obtained according to the classification loss function.

After obtaining the fourth model parameter of the image classification network through training, the model training apparatus performs model-based alternate training. In this case, a weight value of the image classification network needs to be fixed. That is, the fourth model parameter of the image classification network is fixed. The image is then inputted into the offset network. The offset network outputs the fourth prediction class annotation information of the image.

The model training apparatus trains the offset network by using one same classification loss function. The classification loss function is used for estimating a degree of inconsistency between a model prediction value and an actual value. The image content class information of the image is an actual value. The fourth prediction class annotation information of the image is a predicted value. In this case, the fifth model parameter corresponding to the offset network may be obtained based on the classification loss function.

After a plurality of rounds of alternate training, the model training apparatus trains the semantic image segmentation network model based on model parameters (including the second model parameter, the third model parameter, the fourth model parameter, and the fifth model parameter obtained through training) obtained in each round of training. In an example embodiment, after the alternate training ends, offset variables predicted in a training process of the offset network are fused into one relatively complete image content region. Finally, the obtained image content region is used as pixel-level segmented supervised information. The semantic image segmentation network model is trained by using the supervised information, to obtain the semantic image segmentation network model. When the image is inputted into the semantic image segmentation network model, the semantic image segmentation network model outputs a corresponding semantic segmentation result.

Next, in this example embodiment of the disclosure, in the foregoing manner, one branch is fixed, and a strategy of another branch is trained, to enable the image classification network and the offset network to continuously perform adversarial learning, so that a training classifier is continuously enhanced after a region with a weaker information amount is inputted into the image classification network, and the branch of the offset network may also continuously locate a region with weaker discriminativeness.

Optionally, based on the foregoing embodiment(s) corresponding to FIG. 3, in a seventh example embodiment of the method for training an image classification model provided in this embodiment of the disclosure, the training a semantic image segmentation network model based on the second model parameter and the third model parameter, to obtain a final semantic image segmentation network model may include:

determining an image content region corresponding to the image based on an offset variable for training the offset network each time of training the offset network, the offset network being trained N times by using the second model parameter and the third model parameter, N being an integer greater than or equal to 1;

training the semantic image segmentation network model by using a target loss function based on the image content region; and generating the final semantic image segmentation network model when a loss result of the target loss function is minimum.

In this embodiment, a method for generating the semantic image segmentation network model is described. After N times of alternate training ends, all offset variables obtained through prediction in a training process of the offset network are fused. Therefore, a relatively complete image content region may be obtained, to obtain the image content region corresponding to the image. The obtained image content region is used as pixel-level segmented supervised information. Next, the semantic image segmentation network model is trained by using the target loss function. The semantic image segmentation network model is generated when a loss result of the target loss function is minimum.

The semantic image segmentation network model has a very wide application range, for example, perform photo retouching with precise image beautification or assists an uncrewed vehicle in accurately understanding obstacles in front. There are a plurality of methods for performing semantic segmentation by using the semantic image segmentation network model. For example, a threshold method may be used and convert a grayscale image into a binary image with the foreground and background separated. It is assumed that the grayscale image only includes two main classes, namely, foreground image content and a background image. Next, an adequate pixel threshold is found in a manner of balancing an image statistics histogram. All points in the image are classified into the two types. A point with a value greater than the threshold is the image content, and a point with a value less than or equal to the threshold is the background.

In another example, a pixel clustering method may be used. K center points are first chosen. All points in an image are distributed to the K centers based on differences between each pixel point and the K pixels. Subsequently, each class center is recalculated, and iteration and optimization are performed based on the foregoing operations, so that all pixels in the image are classified into K classes.

In another example, an image edge segmentation method may be used. Different regions in an image are segmented by using extracted edge information.

In this example embodiment of the disclosure, in the foregoing manner, the problem that there is an excessively high requirement on data annotation is solved, and a pixel-level annotation does not need to be performed on massive images, to implement semantic image segmentation under a weakly-supervised condition. Only an image-level annotation is needed, and semantic segmentation precision comparable to that of an existing method may be achieved without expensive pixel-level information.

Optionally, based on the foregoing seventh embodiment corresponding to FIG. 3, in an eighth example embodiment of the method for training an image classification model provided in this example embodiment of the disclosure, the target loss function may be represented as:

$$L_{seg} = -\sum_{k=1}^{N} \sum_{i,j} I(c = k) \log P_c^{i,j},$$

where $L_{seg}$ represents the target loss function, N represents a total quantity of classes, c represents a $c^{th}$ class, k is greater than or equal to 1 and less than or equal to N, I( ) represents a Dirac function, $$P_c^{i,j}$$

represents a prediction probability value of the $c^{th}$ class at a pixel point, i represents a horizontal coordinate position of the pixel point in the image, and j represents a vertical coordinate position of the pixel point in the image.

In this embodiment, a target loss function used for performing training to obtain the semantic image segmentation network model is defined. That is, the following target loss function is used:

$$L_{seg} = -\sum_{k=1}^{N}\sum_{i,j} I(c = k)\log P_c^{i,j}.$$

Accordingly, during the training of the semantic image segmentation network model, a pixel-level image is used as a training object, so that the obtained semantic image segmentation network model may predict the class of each feature point in an image.

Next, in this example embodiment of the disclosure, exemplary content of the target loss function is provided. In the foregoing manner, a feasible method may be provided for the implementation of the solution, thereby improving the feasibility and operability of the solution.

Figure 6:
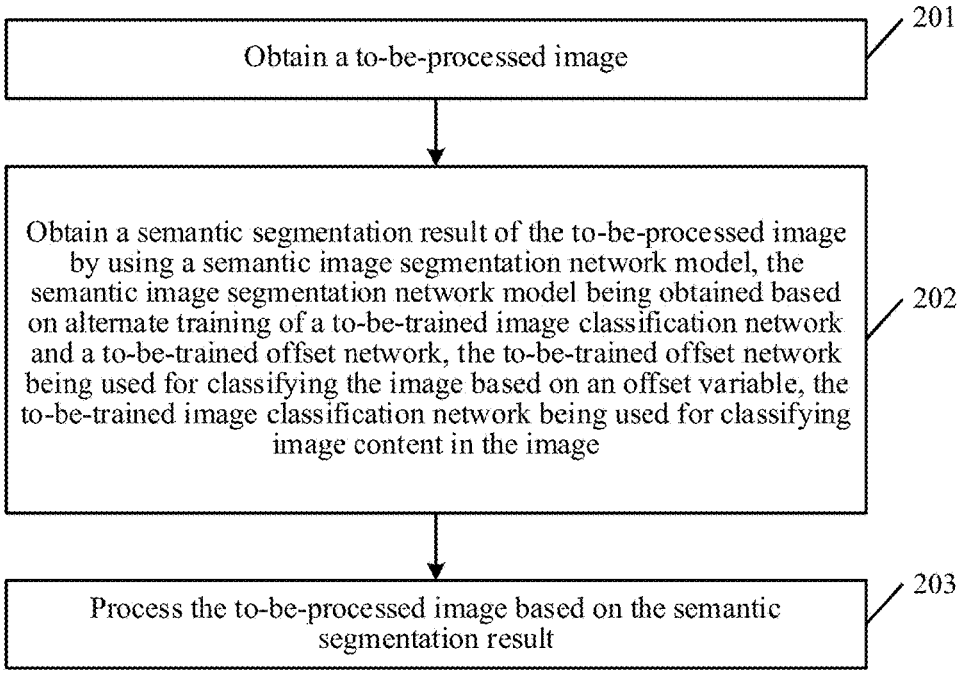
FIG. 6 is a schematic diagram of an embodiment of an image processing method according to an example embodiment of the disclosure.

With reference to the foregoing description, an image processing method in the disclosure is described below. The method may be performed by a computer device, for example, may be performed by a model training apparatus in the computer device. The computer device may be the terminal device or server in the foregoing system shown in FIG. 1. Referring to FIG. 6, an embodiment of an image processing method in this example embodiment of the disclosure includes the following operations 201-203:

201. Obtain an image to be processed.

In this embodiment, after the model training apparatus performs training to obtain a semantic image segmentation network model, the image processing apparatus may obtain an image. When the image processing apparatus is deployed on an uncrewed vehicle, the image processing apparatus may use a camera to obtain a street view image acquired in a travel process of the uncrewed vehicle. When the image processing apparatus is deployed on a robot, the image processing apparatus may acquire in real time a real view image of an environment where the robot is located. When the image processing apparatus is deployed on a handheld device such as a mobile phone or a tablet computer, the image processing apparatus may obtain a photo photographed by a user or a picture downloaded from a website. These images may all be used as images to be processed by using a semantic image segmentation network model.

It would be understood that the image includes, but is not only limited to, the following formats: a BMP format, a PCX format, a TIF, a GIF, a JPEG, an EXIF, an SVG format, a DXF, an EPS format, a PNG format, an HDRI format, and a WMF format.

202. Obtain a semantic segmentation result of the image by using a semantic image segmentation network model, the semantic image segmentation network model being obtained based on alternate training of an image classification network and an offset network, the offset network being used for classifying the image based on an offset variable, the image classification network being used for classifying image content in the image.

In this embodiment, the image processing apparatus inputs the image into the semantic image segmentation network model, and the semantic image segmentation network model outputs a corresponding semantic segmentation result. The semantic image segmentation network model is obtained based on alternate training of an image classification network and an offset network. The offset network is used for classifying the image based on an offset variable. The image classification network is used for classifying image content in the image. It would be understood that a training process of the semantic image segmentation network model may be performed based on the foregoing embodiment(s) of FIG. 3 and the first to eighth embodiments corresponding to FIG. 3. Details are not described herein.

It would be understood that the semantic image segmentation network model may be obtained through training based on a fully convolutional network (FCN), a conditional random field (CRF), or a Markov random field (MRF), or may be obtained through training of a neural network having another structure. Details are not limited herein.

In the FCN, a convolutional technology, an upsampling technology, and a skip structure (skip layer) technology are mainly used. In the convolutional technology, a fully connected layer is discarded in an ordinary classification network, for example, a network such as VGG16 or a residual network (ResNet) 50/101, and is replaced with a corresponding convolutional layer. The upsampling is deconvolution. The deconvolution and convolution are similar, and are both operations of multiplication and addition. The deconvolution is one-to-multiple deconvolutional forward propagation and backpropagation, and it only needs to invert forward propagation and backpropagation of convolution. The function of the skip structure is to optimize a result. If results obtained by directly performing upsampling on results after full convolution are relatively coarse, upsampling needs to be performed on results of different pooling layers to optimize an output.

203. Process the image based on the semantic segmentation result.

In this embodiment, the image processing apparatus processes the image based on the semantic segmentation result. Optionally, the semantic segmentation result may be used for search by an image on a website, that is, search for another image related to the image, or may be used for personalized recommendation or the like based on the analysis of image content. The semantic segmentation result generally has the following characteristics. First, different regions obtained through segmentation are flat inside and have similar texture and grayscale. Second, attributes used as the basis for segmentation are significantly different in adjacent semantic segmentation regions. Third, different semantic regions obtained after segmentation have specific and regular boundaries.

In this example embodiment of the disclosure, in the foregoing manner, weakly-supervised semantic image segmentation may be implemented, and may be applied to a case of annotated data lacking fine pixel-level segmentation, and high-accuracy image segmentation is implemented by only relying on full-image classification and annotation.

Figure 7:
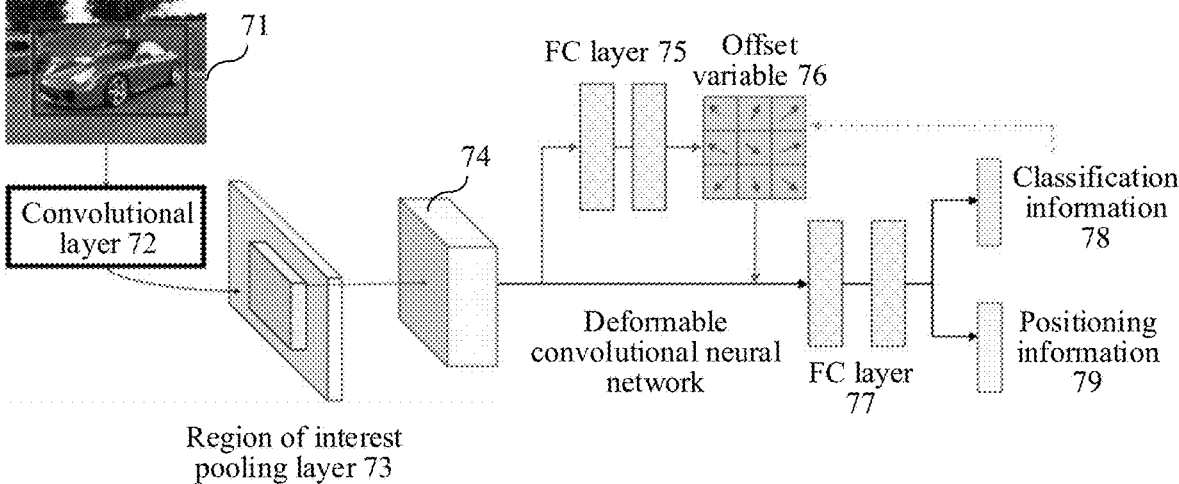
FIG. 7 is a schematic flowchart of image processing based on a deformable convolutional neural network according to an example embodiment of the disclosure.

For ease of understanding, FIG. 7 is a schematic flowchart of image processing based on a deformable convolutional neural network according to an example embodiment of the disclosure. As shown in the figure, an image 71 is obtained first. An image of interest, for example, a red vehicle shown in FIG. 7, is extracted from the image 71. The image of interest extracted from the image 71 is inputted into a convolutional layer 72. A region of interest pooling layer 73 is used to obtain a feature map 74 of the image of interest. In an example embodiment, it is assumed that a target of pooling is a 3×3 feature map. In this case, region of interest pooling may be performed on an inputted image of interest first, to obtain the feature map 74 with a size of 3×3, and an offset variable 76 corresponding to each region is then outputted by using a fully connected layer 75. Through another fully connected layer 77, a semantic segmentation result (including classification information 78 and positioning information 79) is obtained.

Figure 8:
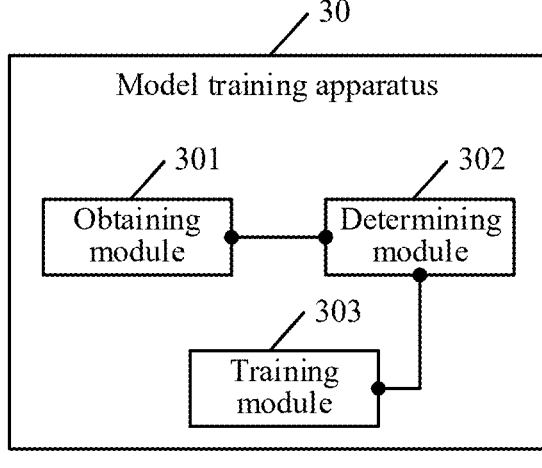
FIG. 8 is a schematic diagram of an embodiment of a model training apparatus according to an example embodiment of the disclosure.

A model training apparatus in the disclosure is described below in detail. The apparatus may be applied to a computer device. For example, the computer device may be a server in the foregoing system shown in FIG. 1. FIG. 8 is a schematic diagram of an embodiment of a model training apparatus according to an example embodiment of the disclosure. A model training apparatus 30 includes:

an obtaining module 301, configured to obtain an image, the image having class annotation information, the class annotation information being used for representing image content class information that is present in the image;

the obtaining module 301, further configured to obtain first prediction class annotation information of the image by using an image classification network when a first model parameter of an offset network is fixed, the offset network being used for classifying the image based on an offset variable, the image classification network being used for classifying image content in the image;

a determining module 302, configured to determine a second model parameter corresponding to the image classification network by using a classification loss function based on the image content class information and the first prediction class annotation information that is obtained by the obtaining module 301;

the obtaining module 301, further configured to obtain second prediction class annotation information of the image by using the offset network when the second model parameter of the image classification network is fixed;

the determining module 302, further configured to determine a third model parameter corresponding to the offset network by using the classification loss function based on the image content class information and the second prediction class annotation information that is obtained by the obtaining module 301; and a training module 303, configured to train a semantic image segmentation network model based on the second model parameter and the third model parameter that are determined by the determining module 302, to obtain a final semantic image segmentation network model that is used for determining a semantic segmentation result of an image.

In this embodiment, the obtaining module 301 obtains an image, the image having class annotation information, the class annotation information being used for representing image content class information that is present in the image, when a first model parameter of an offset network is fixed, the obtaining module 301 obtains first prediction class annotation information of the image by using an image classification network, the offset network being used for classifying the image based on an offset variable, the image classification network being used for classifying image content in the image, the determining module 302 determines a second model parameter corresponding to the image classification network by using a classification loss function based on the image content class information and the first prediction class annotation information that is obtained by the obtaining module 301, when the second model parameter of the image classification network is fixed, the obtaining module 301 obtains second prediction class annotation information of the image by using the offset network, the determining module 302 determines a third model parameter corresponding to the offset network by using the classification loss function based on the image content class information and the second prediction class annotation information that is obtained by the obtaining module 301, the training module 303 trains the semantic image segmentation network model based on the second model parameter and the third model parameter that are determined by the determining module 302, to obtain the semantic image segmentation network model, the semantic image segmentation network model being used for determining a semantic segmentation result of an image.

In this example embodiment of the disclosure, in the foregoing manner, images annotated on an image level may be trained by using an offset network and an image classification network, so that while the performance of a semantic image segmentation network model is ensured, manual pixel-level annotation is not required, to reduce the costs of manual annotation, thereby improving the efficiency of model training.

Optionally, based on the foregoing embodiment corresponding to FIG. 8, in another embodiment of the model training apparatus 30 provided in this example embodiment of the disclosure, the determining module 302 is specifically configured to:
determine a prediction probability value corresponding to each class based on the image content class information and the first prediction class annotation information;

determine a classification loss of the classification loss function based on the prediction probability value corresponding to the each class; and determine the second model parameter corresponding to the image classification network when the classification loss of the classification loss function is minimum.

Next, in this example embodiment of the disclosure, in the foregoing manner, a classification loss of a classification loss function on an image level is minimized, an image classification network having a full-image classification capability may be obtained, and the image classification network has relatively adequate robustness and has a better image classification effect.

Optionally, based on the foregoing embodiment corresponding to FIG. 8, in another embodiment of the model training apparatus 30 provided in this example embodiment of the disclosure, the determining module 302 is specifically configured to:
determine a prediction probability value corresponding to each class based on the image content class information and the second prediction class annotation information;

determine a classification loss of the classification loss function based on the prediction probability value corresponding to the each class; and determine the third model parameter corresponding to the offset network when the classification loss of the classification loss function is maximum.

Next, in this example embodiment of the disclosure, in the foregoing manner, the classification loss of the classification loss function on an image level is maximized, so that the classification difficulty of the image classification network may be improved, to implement adversarial training, to enable the image classification network to have a better classification effect, that is, a better image classification effect. In addition, the classification loss of the classification loss function on an image level is maximized, so that the offset network may provide an input point position that has relatively weak contribution to classification. Based on a changed offset variable, an objective of locating an image content region with relatively low discriminativeness is achieved.

Optionally, based on the foregoing embodiment corresponding to FIG. 8, in another embodiment of the model training apparatus 30 provided in this example embodiment of the disclosure, the classification loss function is represented as:

$$L = -\sum\nolimits_{k=1}^{N} I(c = k)\log P_c,$$

where L represents the classification loss function, I( ) represents a Dirac function, N represents a total quantity of classes, c represents a $c^{th}$ class, k is greater than or equal to 1 and less than or equal to N, and $P_c$ represents a prediction probability value corresponding to the $c^{th}$ class.

Next, in this example embodiment of the disclosure, specific content of the classification loss function is provided. In the foregoing manner, a feasible method may be provided for the implementation of the solution, thereby improving the feasibility and operability of the solution.

Optionally, based on the foregoing embodiment corresponding to FIG. 8, in another embodiment of the model training apparatus 30 provided in this example embodiment of the disclosure, the obtaining module 301 is further configured to obtain a feature image corresponding to the image by using a deformable convolutional neural network before the second prediction class annotation information of the image is obtained by using the offset network, the deformable convolutional neural network being used for predicting the offset variable of the image; and the obtaining module is specifically configured to obtain the second prediction class annotation information corresponding to the feature image by using the offset network.

Next, in this example embodiment of the disclosure, in the foregoing manner, a position offset variable of an input pixel corresponding to each weight in one convolutional kernel may be predicted, to change an actual input feature of convolutional operation, and training is performed to obtain the most effective transformation manner, so that an adversarial training mode may be implemented.

Optionally, based on the foregoing embodiment corresponding to FIG. 8, in another embodiment of the model training apparatus 30 provided in this example embodiment of the disclosure, the obtaining module 301 is specifically configured to generate the feature image in the following manner:

$$y(p_0) = \sum_{p_n \in R} w(p_n) x(p_0 + p_n + \Delta p_n),$$

where $y(p_0)$ represents the feature image, $p_0$ represents a pixel value in the feature image, $p_n$ represents a position of a sampling point in a convolutional kernel, $\Delta p_n$ represents the offset variable, $w(p_n)$ represents a weight value for performing a convolution in the convolutional kernel at a corresponding position in the image, and $x(p_0+p_n+\Delta p_n)$ represents a pixel value at the corresponding position in the image.

Next, in this example embodiment of the disclosure, an exemplary manner of generating the feature image is provided in the foregoing manner. In the foregoing manner, a feasible method may be provided for the implementation of the solution, thereby improving the feasibility and operability of the solution.

Optionally, based on the foregoing embodiment corresponding to FIG. 8, in another embodiment of the model training apparatus 30 provided in this example embodiment of the disclosure, the obtaining module 301 is further configured to obtain third prediction class annotation information of the image by using the image classification network when the third model parameter corresponding to the offset network is fixed after the determining module 302 determines the third model parameter corresponding to the offset network by using the classification loss function based on the image content class information and the second prediction class annotation information;

the determining module 302 is further configured to determine a fourth model parameter corresponding to the image classification network by using the classification loss function based on the image content class information and the third prediction class annotation information that is obtained by the obtaining module 301;

the obtaining module 301 is further configured to obtain fourth prediction class annotation information of the image by using the offset network when the fourth model parameter of the image classification network is fixed;

the determining module 302 is further configured to determine a fifth model parameter corresponding to the offset network by using the classification loss function based on the image content class information and the fourth prediction class annotation information that is obtained by the obtaining module 301;

the training module 303 is specifically configured to train the semantic image segmentation network model based on the second model parameter, the third model parameter, the fourth model parameter, and the fifth model parameter that are determined by the determining module 302, to obtain the semantic image segmentation network model.

Next, in this example embodiment of the disclosure, in the foregoing manner, one branch is fixed, and a strategy of another branch is trained, to enable the image classification network and the offset network to continuously perform adversarial learning, so that a training classifier is continuously enhanced after a region with a weaker information amount is inputted into the image classification network, and the branch of the offset network may also continuously locate a region with weaker discriminativeness.

Optionally, based on the foregoing embodiment corresponding to FIG. 8, in another embodiment of the model training apparatus 30 provided in this example embodiment of the disclosure, the training module 303 is specifically configured to:
determine an image content region corresponding to the image based on an offset variable for training the offset network each time of training the offset network, the offset network being trained N times by using the second model parameter and the third model parameter, N being an integer greater than or equal to 1;

train the semantic image segmentation network model by using a target loss function based on the image content region; and generate the semantic image segmentation network model when a loss result of the target loss function is minimum.

Next, in this example embodiment of the disclosure, in the foregoing manner, the problem that there is an excessively high requirement on data annotation is solved, and a pixel-level annotation does not need to be performed on massive images, to implement semantic image segmentation under a weakly-supervised condition. Only an image-level annotation is needed, and semantic segmentation precision comparable to that of an existing method may be achieved without expensive pixel-level information.

Optionally, based on the foregoing embodiment corresponding to FIG. 8, in another embodiment of the model training apparatus 30 provided in this example embodiment of the disclosure, the target loss function is represented as:

$$L_{seg} = -\sum_{k=1}^{N}\sum_{i,j}I(c = k)\log P_{c}^{i,j},$$

where $L_{seg}$ represents the target loss function, N represents a total quantity of classes, c represents a $c^{th}$ class, k is greater than or equal to 1 and less than or equal to N, I( ) represents a Dirac function, $P_{c}^{i,j}$ represents a prediction probability value of the $c^{th}$ class at a pixel point, i represents a horizontal coordinate position of the pixel point in the image, and j represents a vertical coordinate position of the pixel point in the image.

Next, in this example embodiment of the disclosure, exemplary content of the target loss function is provided. In the foregoing manner, a feasible method may be provided for the implementation of the solution, thereby improving the feasibility and operability of the solution.

Figure 9:
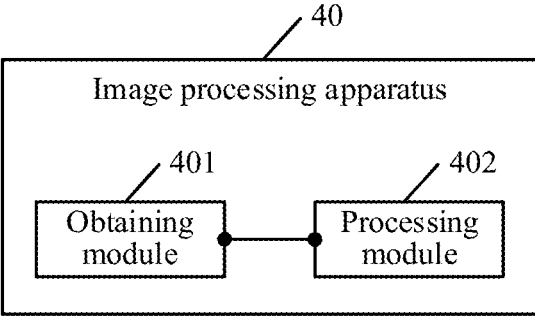
FIG. 9 is a schematic diagram of an embodiment of an image processing apparatus according to an example embodiment of the disclosure.

An image processing apparatus in the disclosure is described below in detail. The apparatus may be applied to a computer device. For example, the computer device may be a server or terminal device in the foregoing system shown in FIG. 1. FIG. 9 is a schematic diagram of an embodiment of an image processing apparatus according to an example embodiment of the disclosure. An image processing apparatus 40 includes:

an obtaining module 401, configured to obtain an image;

the obtaining module 401, further configured to obtain a semantic segmentation result of the image by using a semantic image segmentation network model, the semantic image segmentation network model being obtained based on alternate training of an image classification network and an offset network, the offset network being used for classifying the image based on an offset variable, the image classification network being used for classifying image content in the image; and a processing module 402, configured to process the image based on the semantic segmentation result obtained by the obtaining module 401.

In this embodiment, the obtaining module 401 obtains an image, the obtaining module 401 obtains a semantic segmentation result of the image by using a semantic image segmentation network model, the semantic image segmentation network model being obtained based on alternate training of an image classification network and an offset network, the offset network being used for classifying the image based on an offset variable, the image classification network being used for classifying image content in the image, and the processing module 402 processes the image based on the semantic segmentation result obtained by the obtaining module 401.

In this example embodiment of the disclosure, in the foregoing manner, weakly-supervised semantic image segmentation may be implemented, and may be applied to a case of annotated data lacking fine pixel-level segmentation, and high-accuracy image segmentation is implemented only relying on full-image classification and annotation.

Figure 10:
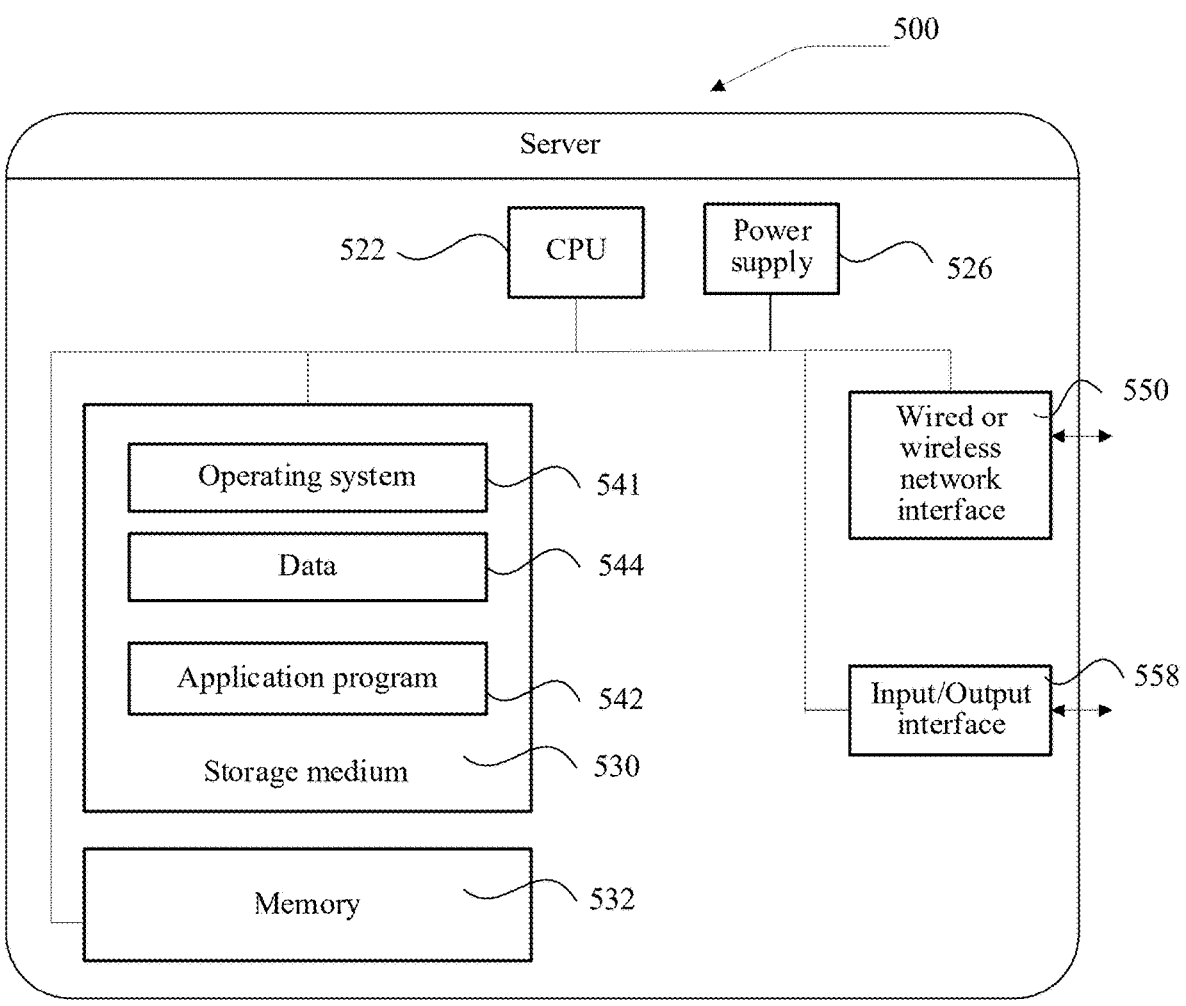
FIG. 10 is a schematic structural diagram of a server according to an example embodiment of the disclosure.

FIG. 10 is a schematic structural diagram of a server according to an example embodiment of the disclosure. The server 500 may vary greatly due to different configurations or performance, and may include one or more central processing units (CPU) 522 (for example, one or more processors) and a memory 532, and one or more storage media 530 (for example, one or more mass storage devices) that store application programs 542 or data 544. The memory 532 and the storage medium 530 may be transient or persistent storages. A program stored in the storage medium 530 may include one or more modules (which are not marked in the figure), and each module may include a series of instruction operations on the server. Further, the CPU 522 may be set to communicate with the storage medium 530, and perform, on the server 500, the series of instruction operations in the storage medium 530.

The server 500 may further include one or more power supplies 526, one or more wired or wireless network interfaces 550, one or more input/output interfaces 558, and/or one or more operating systems 541 such as Windows Server™, Mac OS X™, Unix™, Linux™, or FreeBSD™.

The operations performed by the server in the foregoing embodiments may be based on the server structure shown in FIG. 10.

In the embodiments of the disclosure, the CPU 522 included in the server may further be configured to perform all or some operations in the foregoing embodiment shown in FIG. 3 or FIG. 6.

Figure 11:
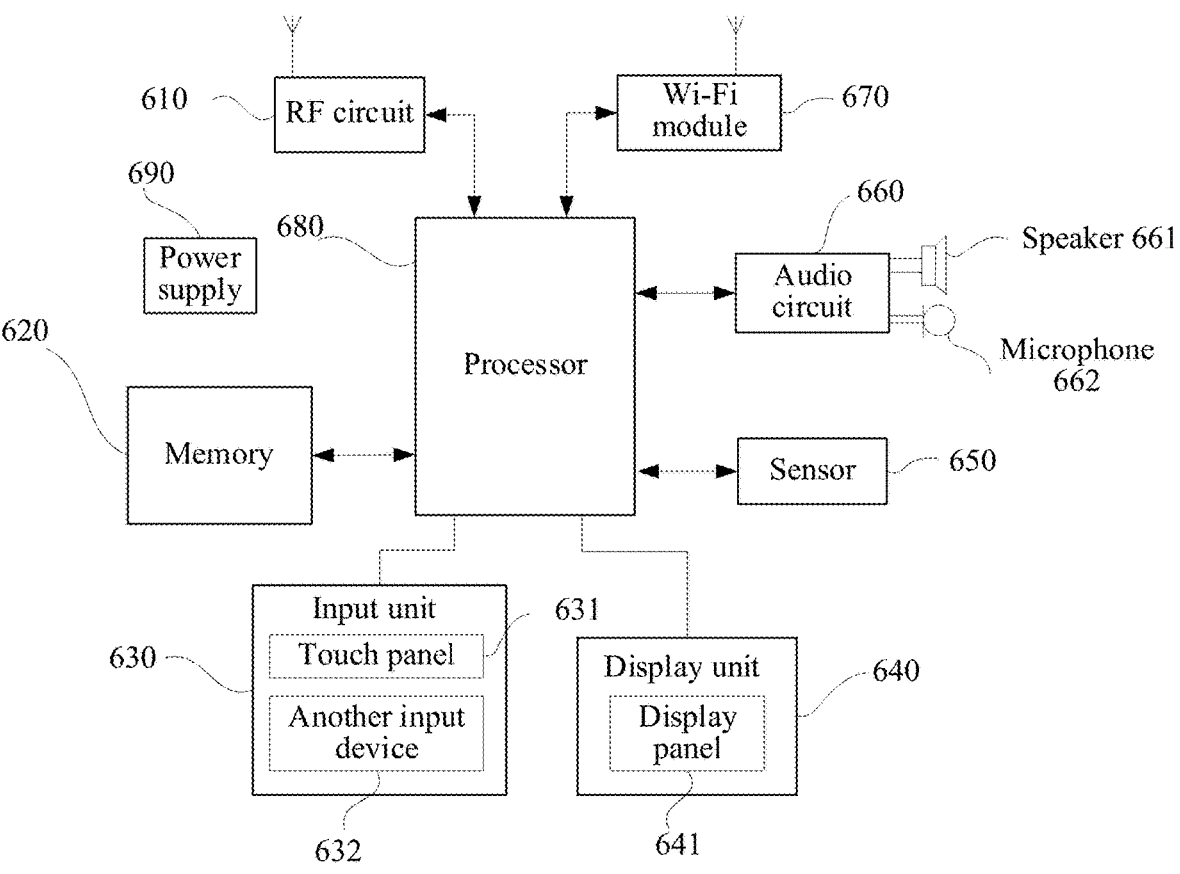
FIG. 11 is a schematic structural diagram of a terminal device according to an example embodiment of the disclosure.

An example embodiment of the disclosure further provides another image processing apparatus, as shown in FIG. 11. For convenience of description, only parts related to this example embodiment of the disclosure are shown. For specific technical details that are not disclosed, refer to the method part of the embodiments of the disclosure. The terminal device may be any terminal device including a mobile phone, a tablet computer, a personal digital assistant (PDA), a point of sales (POS), and an on-board computer, and the terminal device being a mobile phone is used as an example.

FIG. 11 is a block diagram of the structure of a part of a mobile phone related to a terminal device according to an example embodiment of the disclosure. Referring to FIG. 11, the mobile phone includes components such as: a radio frequency (RF) circuit 610, a memory 620, an input unit 630, a display unit 640, a sensor 650, an audio circuit 660, a wireless fidelity (Wi-Fi) module 670, a processor 680, and a power supply 690. A person skilled in the art would understand that the structure of the mobile phone shown in FIG. 11 does not constitute a limitation on the mobile phone, and the mobile phone may include more components or fewer components than those shown in the figure, or some components may be combined, or a different component deployment may be used.

The following makes a specific description of components of the mobile phone with reference to FIG. 11.

The RF circuit 610 may be configured to receive and transmit signals during an information receiving and transmitting process or a call process. Specifically, the RF circuit receives downlink information from a base station, then delivers the downlink information to the processor 680 for processing, and transmits designed uplink data to the base station.

The memory 620 may be configured to store a software program and module. The processor 680 runs the software program and module stored in the memory 620, to implement various functional applications and data processing of the mobile phone.

The input unit 630 may be configured to receive input digit or character information, and generate a keyboard signal input related to the user setting and function control of the mobile phone. For example, the input unit 630 may include a touch panel 631 and another input device 632. In addition to the touch panel 631, the input unit 630 may further include the another input device 632. For example, the another input device 632 may include, but is not limited to, one or more of a physical keyboard, a functional key (such as a volume control key or a switch key), a track ball, a mouse, and a joystick.

The display unit 640 may be configured to display information input by the user or information provided for the user, and various menus of the mobile phone. The display unit 640 may include a display panel 641. Optionally, the display panel 641 may be configured by using a liquid crystal display (LCD), an organic light-emitting diode (OLED), or the like. Further, the touch panel 631 may cover the display panel 641. Although in FIG. 11, the touch panel 631 and the display panel 641 are used as two separate parts to implement input and output functions of the mobile phone, in some embodiments, the touch panel 631 and the display panel 641 may be integrated to implement the input and output functions of the mobile phone.

The mobile phone may further include at least one sensor 650 such as an optical sensor, a motion sensor, and other sensors.

The audio circuit 660, a loudspeaker 661, and a microphone 662 may provide audio interfaces between the user and the mobile phone.

Although FIG. 11 shows the Wi-Fi module 670, it would be understood that the Wi-Fi module is not a necessary component of the mobile phone, and the Wi-Fi module may be omitted as required provided that the scope of the essence of the disclosure is not changed.

The processor 680 is a control center of the mobile phone, and is connected to various parts of the entire mobile phone by using various interfaces and lines. By running or executing a software program and/or module stored in the memory 620, and invoking data stored in the memory 620, the processor executes various functions of the mobile phone and performs data processing, thereby monitoring the entire mobile phone.

The mobile phone further includes the power supply 690 (such as a battery) for supplying power to the components. Optionally, the power supply may be logically connected to the processor 680 by using a power management system.

Although not shown in the figure, the mobile phone may further include a camera, a Bluetooth module, and the like, and details are not described herein again.

In the embodiments of the disclosure, the processor 680 included in the terminal device may further be configured to perform all or some operations in the foregoing embodiment shown in FIG. 3 or FIG. 6.

A person skilled in the art may clearly understand that for convenience and conciseness of description, for specific working processes of the foregoing systems, devices and units, reference may be made to the corresponding processes in the foregoing method embodiments, and details are not described herein again.

In the several embodiments provided in the disclosure, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the prior art, or all or some of the technical solutions may be implemented in the form of a software product. The computer software product is stored in a storage medium and includes several instructions for instructing a computer device (which may be a PC, a server, a network device, or the like) to perform all or some of the operations of the methods described in the embodiments of the disclosure. The foregoing storage medium includes: any medium that may store program code, such as a USB flash drive, a removable hard disk, a read-only memory (ROM), a random access memory (RAM), a magnetic disk or an optical disc.

It may be seen from the foregoing technical solutions that the example embodiments of the disclosure have the following advantages.

In the example embodiments of the disclosure, a method for training an image classification model is provided. The method includes: first obtaining an image, obtaining first prediction class annotation information of the image by using an image classification network when a first model parameter of an offset network is fixed, next, determining a second model parameter corresponding to the image classification network by using a classification loss function based on image content class information and the first prediction class annotation information, obtaining second prediction class annotation information of the image by using the offset network when the second model parameter of the image classification network is fixed, next, determining a third model parameter corresponding to the offset network by using the classification loss function based on the image content class information and the second prediction class annotation information, and finally, training a semantic image segmentation network model based on the second model parameter and the third model parameter, to obtain a final semantic image segmentation network model. In the foregoing manner, images annotated on an image level may be trained by using an offset network and an image classification network, so that while the performance of a semantic image segmentation network model is ensured, manual pixel-level annotation is not required, to reduce the costs of manual annotation, thereby improving the efficiency of model training.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions of the disclosure, but not for limiting the disclosure. Although the disclosure is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of the disclosure.

What is claimed is:

1. A method for training an image classification model, performed by a computer device, and comprising:
   obtaining a first image having class annotation information, the class annotation information representing image content class information of an image content that is included in the first image;
   obtaining first prediction class annotation information of the first image by using an image classification network based on a first model parameter of an offset network being fixed, the offset network being configured to classify the first image based on an offset variable, the image classification network being configured to classify the image content in the first image;
   determining a second model parameter corresponding to the image classification network by using a classification loss function based on the image content class information and the first prediction class annotation information;
   obtaining second prediction class annotation information of the first image by using the offset network based on the second model parameter of the image classification network being fixed;
   determining a third model parameter corresponding to the offset network by using the classification loss function based on the image content class information and the second prediction class annotation information; and
   training a semantic image segmentation network model based on the second model parameter and the third model parameter, to obtain a final semantic image segmentation network model configured to determine a semantic segmentation result of a second image.

2. The method according to claim 1, wherein the determining the second model parameter comprises:
   determining a prediction probability value corresponding to each class based on the image content class information and the first prediction class annotation information;
   determining a classification loss of the classification loss function based on the prediction probability value corresponding to the each class; and
   determining the second model parameter corresponding to the image classification network based on the classification loss of the classification loss function being minimum.

3. The method according to claim 2, wherein the classification loss function is represented as:

$$L = -\sum_{k=1}^{N} I(c = k)\log P_c,$$

wherein L represents the classification loss function, I( ) represents a Dirac function, N represents a total quantity of classes, c represents a $c^{th}$ class, k is greater than or equal to 1 and less than or equal to N, and $P_c$ represents a prediction probability value corresponding to the $c^{th}$ class.

4. The method according to claim 1, wherein the determining the third model parameter comprises:
   determining a prediction probability value corresponding to each class based on the image content class information and the second prediction class annotation information;
   determining a classification loss of the classification loss function based on the prediction probability value corresponding to the each class; and
   determining the third model parameter corresponding to the offset network based on the classification loss of the classification loss function being maximum.

5. The method according to claim 1, wherein the obtaining the second prediction class annotation information comprises:
   obtaining a feature image corresponding to the first image by using a deformable convolutional neural network, the deformable convolutional neural network being configured to predict the offset variable of the first image; and obtaining the second prediction class annotation information corresponding to the feature image by using the offset network.

6. The method according to claim 5, wherein the obtaining the feature image comprises generating the feature image in the following manner:

$$y(p_0) = \sum_{p_n \in R} w(p_n)x(p_0 + p_n + \Delta p_n),$$

wherein $y(p_0)$ represents the feature image, $p_0$ represents a pixel value in the feature image, $p_n$ represents a position of a sampling point in a convolutional kernel, $\Delta p_n$ represents the offset variable, $w(p_n)$ represents a weight value for performing a convolution in the convolutional kernel at a corresponding position in the first image, and $x(p_0+p_n+\Delta p_n)$ represents a pixel value at the corresponding position in the first image.

7. The method according to claim 1, further comprising, after the determining the third model parameter:

obtaining third prediction class annotation information of the first image by using the image classification network based on the third model parameter corresponding to the offset network being fixed;

determining a fourth model parameter corresponding to the image classification network by using the classification loss function based on the image content class information and the third prediction class annotation information;

obtaining fourth prediction class annotation information of the first image by using the offset network based on the fourth model parameter of the image classification network being fixed; and determining a fifth model parameter corresponding to the offset network by using the classification loss function based on the image content class information and the fourth prediction class annotation information; and the training the semantic image segmentation network model comprises:

training the semantic image segmentation network model based on the second model parameter, the third model parameter, the fourth model parameter, and the fifth model parameter, to obtain the final semantic image segmentation network model.

8. The method according to claim 1, wherein the training the semantic image segmentation network model comprises:

determining an image content region corresponding to the first image based on an offset variable for training the offset network each time of training the offset network, the offset network being trained N times by using the second model parameter and the third model parameter, N being an integer greater than or equal to 1;

training the semantic image segmentation network model by using a target loss function based on the image content region; and generating the semantic image segmentation network model based on a loss result of the target loss function being minimum.

9. The method according to claim 8, wherein the target loss function is represented as:

$$L_{seg} = -\sum_{k=1}^{N} \sum_{i,j} I(c = k)\log P_c^{i,j},$$

wherein $L_{seg}$ represents the target loss function, N represents a total quantity of classes, c represents a $c^{th}$ class, k is greater than or equal to 1 and less than or equal to N, I( ) represents a Dirac function, $$P_c^{i,j}$$

represents a prediction probability value of the $c^{th}$ class at a pixel point, i represents a horizontal coordinate position of the pixel point in the first image, and j represents a vertical coordinate position of the pixel point in the first image.

10. A server, comprising a memory, and a processor, the memory being configured to store a program; and the processor being configured to execute the program in the memory to perform operations of claim 1.

11. A non-transitory computer-readable storage medium, comprising instructions, the instructions, when run on a computer, causing the computer to perform the method according to claim 1.

12. An image processing method, performed by a computer device, and comprising:

obtaining a semantic segmentation result of an image by using a semantic image segmentation network model, the semantic image segmentation network model being obtained based on alternate training of an image classification network and an offset network, the offset network being configured to classify the image based on an offset variable, the image classification network being configured to classify image content in the image; and processing the image based on the semantic segmentation result, wherein during the alternate training of the image classification network and the offset network, the image classification network is trained by fixing a model parameter of the offset network and by using a classification loss function, and the offset network is trained by fixing a model parameter of the image classification network and by using the same classification loss function.

13. A terminal device, comprising: a memory, and a processor, the memory being configured to store a program; and the processor being configured to execute the program in the memory to perform operations of claim 12.

14. A non-transitory computer-readable storage medium, comprising instructions, the instructions, when run on a computer, causing the computer to perform the method according to claim 12.

15. A model training apparatus, applicable to a computer device, and comprising:

at least one memory configured to store program code; and at least one processor configured to read the program code and operate as instructed by the program code, the program code comprising:

first obtaining code configured to cause at least one of the at least one processor to obtain a first image having class annotation information, the class annotation information representing image content class information of an image content that is included in the first image;

second obtaining code configured to cause at least one of the at least one processor to obtain first prediction class annotation information of the first image by using an image classification network based on a first model parameter of an offset network being fixed, the offset network being configured to classify the first image based on an offset variable, the image classification network being configured to classify the image content in the first image;

first determining code configured to cause at least one of the at least one processor to determine a second model parameter corresponding to the image classification network by using a classification loss function based on the image content class information and the first prediction class annotation information;

third obtaining code configured to cause at least one of the at least one processor to obtain second prediction class annotation information of the first image by using the offset network based on the second model parameter of the image classification network being fixed;

second determining code configured to cause at least one of the at least one processor to determine a third model parameter corresponding to the offset network by using the classification loss function based on the image content class information and the second prediction class annotation information; and training code configured to cause at least one of the at least one processor to train a semantic image segmentation network model based on the second model parameter and the third model parameter, to obtain a final semantic image segmentation network model that is used for determining a semantic segmentation result of a second image.

16. The apparatus according to claim 15, wherein the first determining code is further configured to cause at least one of the at least one processor to determine a prediction probability value corresponding to each class based on the image content class information and the first prediction class annotation information; determine a classification loss of the classification loss function based on the prediction probability value corresponding to the each class; and determine the second model parameter corresponding to the image classification network based on the classification loss of the classification loss function being minimum.

17. The apparatus according to claim 16, wherein the classification loss function is represented as:

$$L = -\sum_{k=1}^{N} I(c = k)\log P_c,$$

wherein L represents the classification loss function, $I(\ )$ represents a Dirac function, N represents a total quantity of classes, c represents a $c^{th}$ class, k is greater than or equal to 1 and less than or equal to N, and $P_c$ represents a prediction probability value corresponding to the $c^{th}$ class.

18. The apparatus according to claim 15, wherein the second determining code is further configured to cause at least one of the at least one processor to determine a prediction probability value corresponding to each class based on the image content class information and the second prediction class annotation information; determine a classification loss of the classification loss function based on the prediction probability value corresponding to the each class; and determine the third model parameter corresponding to the offset network based on the classification loss of the classification loss function being maximum.

19. The apparatus according to claim 15, wherein the third obtaining code is further configured to cause at least one of the at least one processor to obtain a feature image corresponding to the first image by using a deformable convolutional neural network, the deformable convolutional neural network being configured to predict the offset variable of the first image; and obtain the second prediction class annotation information corresponding to the feature image by using the offset network.

20. The apparatus according to claim 19, wherein the third obtaining code is further configured to cause at least one of the at least one processor to generate the feature image in the following manner:

$$y(p_0) = \sum_{p_n \in R} w(p_n)x(p_0 + p_n + \Delta p_n),$$

wherein $y(p_0)$ represents the feature image, $p_0$ represents a pixel value in the feature image, $p_n$ represents a position of a sampling point in a convolutional kernel, $\Delta p_n$ represents the offset variable, $w(p_n)$ represents a weight value for performing a convolution in the convolutional kernel at a corresponding position in the first image, and $x(p_0+p_n+\Delta p_n)$ represents a pixel value at the corresponding position in the first image.

\* \* \* \* \*